United States Patent [19]

Hendren

[11] Patent Number: 4,974,802

[45] Date of Patent: Dec. 4, 1990

[54] ADJUSTABLE SWIVEL

[75] Inventor: Herbert Hendren, Indianapolis, Ind.

[73] Assignee: Hava Nice Life, Inc., Columbus, Ind.

[21] Appl. No.: 368,479

[22] Filed: Jun. 19, 1989

[51] Int. Cl.⁵ ............................................. F16M 11/14
[52] U.S. Cl. ................................. 248/181; 248/288.5; 403/90
[58] Field of Search ............... 248/481, 482, 483, 484, 248/516, 181, 182, 288.3, 288.5; 354/293; 403/90; 285/184

[56] References Cited

U.S. PATENT DOCUMENTS

| | | | |
|---|---|---|---|
| 86,173 | 1/1969 | Maynard . | |
| 807,857 | 12/1905 | Palmenberg | 248/288.3 |
| 1,780,383 | 11/1930 | Green | 248/181 |
| 2,125,053 | 7/1938 | Scepaniak | 248/288.3 |
| 2,161,718 | 6/1939 | Miller . | |
| 2,260,995 | 10/1941 | Kruczek . | |
| 2,703,691 | 3/1955 | Minnis | 248/181 |
| 2,719,043 | 9/1955 | Oppenheimer . | |
| 2,752,116 | 6/1956 | Minnis | 248/181 |
| 2,859,983 | 11/1958 | May | 248/288.3 |
| 3,211,405 | 10/1965 | Fey et al. . | |
| 3,319,982 | 5/1967 | Schwartz | 403/90 |
| 3,622,112 | 11/1971 | Stroh | 248/181 |
| 4,066,231 | 1/1978 | Bahner | 248/288.3 |
| 4,674,523 | 6/1987 | Glatz . | |

FOREIGN PATENT DOCUMENTS

| | | | |
|---|---|---|---|
| 2256896 | 10/1973 | Fed. Rep. of Germany | 248/181 |
| 1018869 | 10/1952 | France | 248/181 |
| 292576 | 1/1932 | Italy | 248/181 |
| 125909 | 8/1949 | Sweden | 248/181 |
| 17919 | of 1898 | United Kingdom | 248/482 |

Primary Examiner—David M. Purol
Assistant Examiner—Robert A. Olson
Attorney, Agent, or Firm—Barnes & Thornburg

[57] ABSTRACT

A swivel mount for mounting cameras and other such instruments on supports such as tripods. A base member is mounted to the support, with a spherical ball mounted for swivel movement on the base. Cam actuating means is provided to selectively loosen the ball for movement or to lock the ball against relative movement. An annular cap is included to hold the ball in position on the base. Resilient means including a spring washer is disposed between the ball and base means, and a resilient O-ring is disposed between the ball and an internal surface of the cap.

9 Claims, 1 Drawing Sheet

ADJUSTABLE SWIVEL

The present invention relates to adjustable swivels of the type used to mount cameras and telescopes and other such instruments on supports such as, for instance, tripods, and more particularly to the provision of such a swivel mount that can be instantly released for selective adjustment and instantly relocked into the selected position.

Swivel mounts for cameras, telescopes and other critical instruments which must be selectively adjustably positioned, and securely held in the selected position, are well known. Such mounts which use a spherical ball as the "swivel joint" or "swivel bearing" are well known. Examples of prior art ball-type swivels are shown in such prior patents as U.S. Pat. Nos. 86,173; 2,161,718; 2,260,995; 2,719,043; 3,211,405; and 4,674,523.

The swivel mount of the present invention is an improvement over the prior art devices in that it is a low-cost device including a relatively large swivel ball for the size of the total device and actuating means for instantly and easily locking the ball rigidly in a selected position. The actuating means is arranged such that the ball can be instantly released by operating a handle and then instantly relocked into the selected position merely by releasing the handle.

It is an object of the present invention, therefore, to provide a swivel mount comprising a base member adapted to be mounted on a support, such as a tripod, a spherical ball provided with means for connecting an item such as a camera to be selectively adjustably positioned as the ball is positioned, and actuating means for selectively loosening the ball for swivel movement on the base member and locking the ball against movement relative to the base member. In the preferred embodiment of the present invention, the actuating means comprises a piston movable on the base member into and out of engagement with the ball, spring means for yieldably urging the piston into engagement with the ball to lock it in a selected position, and means for moving the piston against the urging of the spring means out of engagement with the ball to free the ball for swivel movement.

Another object of the present invention is to provide such a swivel joint in which the means for moving the piston Comprises a rotary Cam in engagement with the piston to drive it as the cam rotates, and a lever for driving the cam to move the piston against the spring means to release the ball.

Another object of the present invention is to provide such a swivel mount further comprising resilient means for engaging the ball to provide frictional resistance to movement relative to the base member. This resilient means may take several forms including large rubber-like O-rings and at least one spring washer engaging substantial outer peripheral portions of the ball.

A further object of the present invention is to provide such a base member which is formed as an upright, cup-shaped member having an upwardly-opening chamber therein with the ball being disposed in the upper portion of the chamber for swivel movement. An annular cap for the chamber is provided to hold the ball in position therein, the cap having a central opening exposing an upper portion of the ball and its connecting means, i.e., its threaded opening or other means which may be used rigidly to support a camera, telescope, or other instrument. In this preferred embodiment of the present invention, the piston which engages the ball to lock it in position is disposed within the cup-shaped chamber for movement upwardly into engagement with the ball and downwardly to release the ball. The drive cam is mounted in the chamber for rotational movement and the spring means for yieldably urging the piston against the ball is disposed in the bottom of the chamber.

The present invention, therefore, provides a very compact swivel joint assembly having an outer case which is not significantly greater in diameter than the swivel ball inside the case. As an example, in accordance with the present invention, a swivel ball having a diameter of about 3.3 inches may be contained within a housing about 4.4 inches in diameter. That same 3.3 inches diameter swivel ball may be included in a housing which may be only 7.5 inches in total height, giving room for a rather large piston and spring within the housing to control the ball. An important feature of the present invention is to have the control piston be rather large in diameter as compared to the ball and preferably having a diameter greater than about ⅔ the diameter of the ball. Then, the control piston is provided with a spherically concave upper piston face which conformingly receives a substantial lower portion of the swivel ball. This piston face may preferably be provided with a resilient pad, in the nature of a brake pad, which firmly grips the swivel ball to lock it in position.

Other objects and features of the present invention will become apparent as this description progresses.

Figure 1:
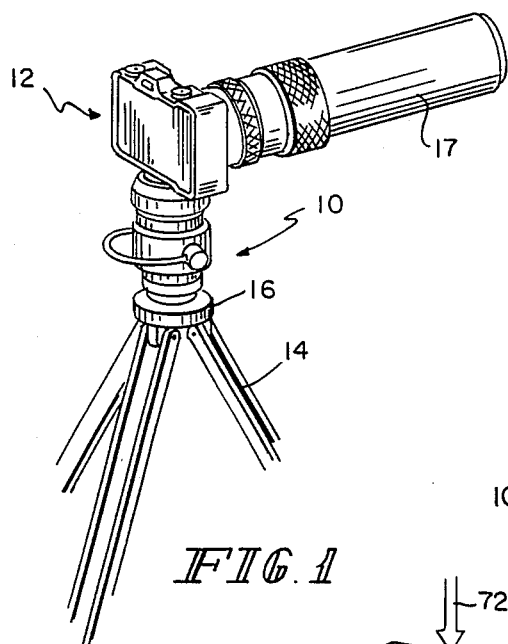
FIG. 1 is a perspective view of the swivel mount of the present invention showing a camera mounted on the swivel mount and the swivel mount mounted on a conventional tripod.
Figure 2:
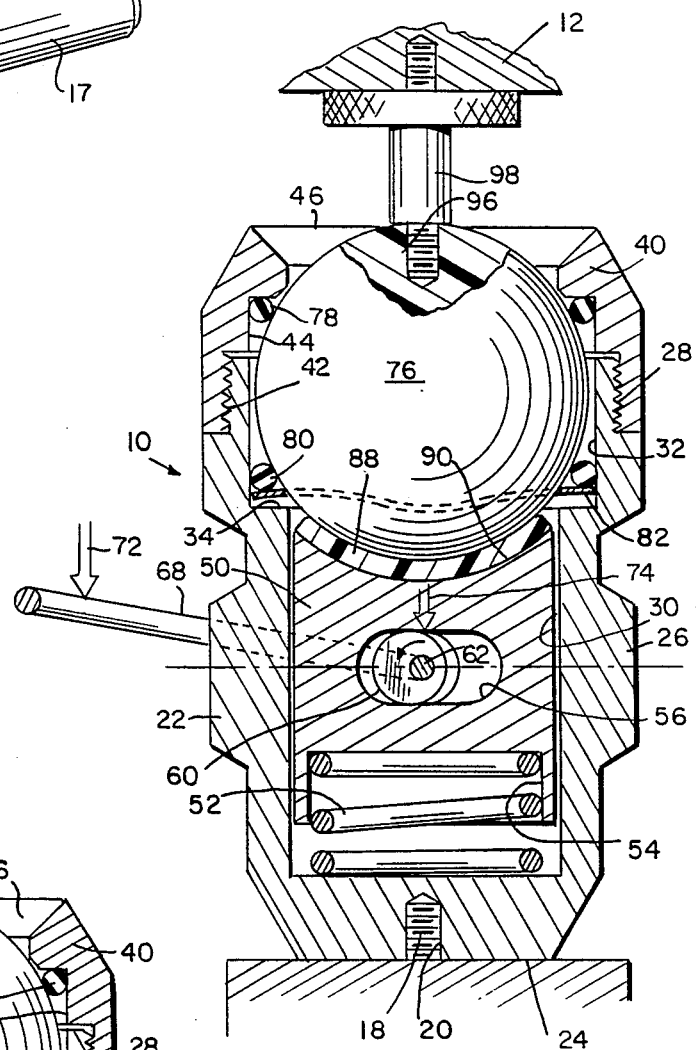
FIG. 2 is a sectional view of the swivel mount.
Figure 3:
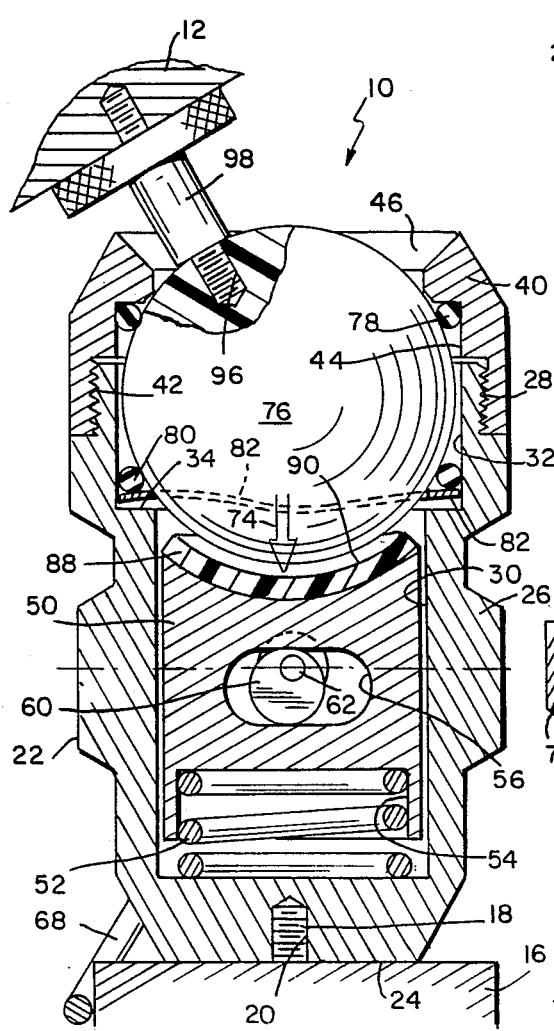
FIG. 3 is another sectional view of the swivel mount showing the parts moved away from their FIG. 2 positions.

Turning now to the drawings, it will be seen that the illustrative swivel mount 10 is shown supporting a camera 12 mounted on a conventional tripod 14 having an upper support plate 16. The camera 12 is shown having a rather large telescopic lens 17 which adds weight to the camera 12 and which must be stabilized in any selected position provided by the swivel mount 10. It will be appreciated that a camera 12 or a large telescope must have a very stable swivel mounting, i.e., a mounting which will firmly and rigidly support the camera 12 in any selected position and prevent shaking movement of the lens 17.

In the illustrative embodiment, the upper support plate 16 of tripod 14 is shown provided with a rather large screw 18 which threads upwardly into an opening 20 in the base member 22 of the swivel mount 10. Particularly, this base member 22 has a bottom floor 24 which is flat on its bottom and which is provided with the threaded opening 20 into which the screw 18 is engaged. In the illustrative and preferred embodiment, this base member 22 is formed in a cup-shaped manner to provide an upstanding wall 26 terminating at its uppermost portion with a thread 28 as indicated. This base member 22 is formed to provide a cylindrical chamber having a lower chamber portion 30 and a somewhat larger diameter upper chamber portion 32. An upwardly facing annular ledge 34 provides a transition between the lower chamber 30 and the upper chamber 32.

Then, the illustrative embodiment includes an annular cap 40 with a thread as indicated at 42 engaged with the thread 28 to close the upper chamber 32 of the base member 22. The inside of this annular cap 40 is formed to provide a continuation 44 of the upper chamber 32 in the illustrative embodiment. Annular cap 40 is formed to include a central opening 46.

A piston 50 is disposed within the base member 22 in the lower chamber 30 for reciprocable movement along the axis of the chamber. It will be appreciated that the piston 50 may be somewhat loosely slidably or reciprocably disposed within the lower chamber 30 for movement toward and away from the upper chamber 32. A rather heavy force spring 52 is disposed at the bottom of the chamber 30 and arranged yieldably to urge the piston 50 upwardly. This spring 52 is shown disposed in a downwardly opening cavity 54 formed in the piston 50. The piston 50 is also shown having an opening 56 extending transaxially therethrough. This opening 56 has upper and lower generally horizontally extending walls which serve as cam followers as will be described hereinafter.

Figure 4:
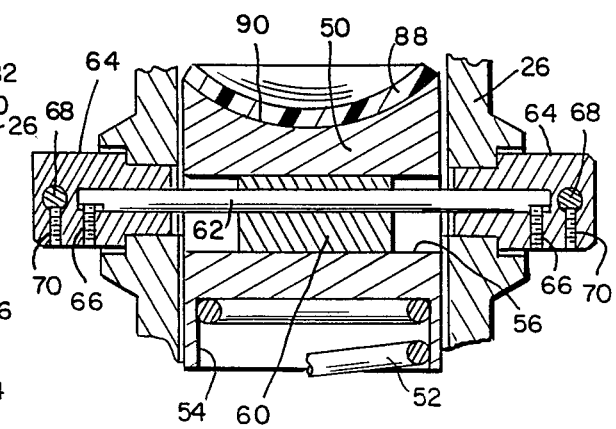
FIG. 4 is a fragmentary sectional view of the swivel mount showing in more detail the cam-drive system.

A cam 60 is disposed in the through opening 56 in the piston 50. This cam 60 is illustratively shown as a cylindrical cam having a diameter which is only slightly smaller than the distance between the upper and lower walls of the through opening 56. The cam 60 is rigidly and eccentrically mounted on a shaft 62 which extends transaxially outwardly through the upstanding wall 26 of the base member 22 as best seen in FIG. 4. The shaft 62 is journal mounted in the wall 26 by bearings indicated at 64. The shaft 62 is locked for rotation with the bearings 64 by means of set screws indicated at 66. A handle, in the form of a U-shaped bail 68, is also rigidly attached to the bearings 64 by means of set screws indicated at 70. When the handle 68 is moved, the cam 60 is rotated about the axis of the shaft 62 to drive the piston 50 against the spring 52. Pushing down on the handle 68 as indicated by the arrow 72 will move the piston down as indicated by the arrow 74.

Then, the illustrative embodiment is shown having a large spherical ball 76 disposed mostly in the upper chamber 32 of the base member 22 for swivel movement about the center of the ball 76. Resilient means are provided for holding the ball 76 in frictional engagement within the swivel mount housing, the illustrative resilient means including rubber-like O-rings 78, 80 and a resilient spring washer 82. The O-rings 78, 80, which are disposed about the upper and lower portions, respectively, of the ball 76 between the ball 76 and upper chamber 32 of the housing, provide good smooth frictional resistance to movement of the ball 76 when it is free for movement within the swivel mount 10. The spring washer 82 also provides for smooth movement of the ball 76. It will be seen that the spring washer 82 is disposed in the upper chamber 32 generally above the and in contact with the upwardly facing ledge 34. The ball 76 is illustratively trapped between the spring washer 82 and the O-ring 78 which is against the cap 40.

In between the piston 50 and the ball 76 is a resilient pad 88 which is attached to the spherically shaped concave surface 90 of the piston 50. It will be appreciated that the piston 50 has a diameter somewhat larger than, for instance, ⅔ the diameter of the spherical ball 76.

The ball 76 is provided with a threaded opening 96 for receiving a threaded mounting stud 98 for the camera 12. This threaded opening 96 is just one of many ways to provide a connecting or mounting means on the ball 76.

What is claimed is:

1. A swivel mount comprising a base member adapted to be mounted on a support, a spherical ball provided with means for connecting an item to be selectively adjustably positioned as said ball is positioned, and actuating means for selectively loosening said ball for swivel movement on said base member and locking said ball against movement relative to said base member, said base member being formed as an upright cup-shaped member having an upwardly opening chamber therein, said ball being disposed in the upper portion of said chamber for swivel movement, an annular cap for said chamber to hold said ball in position therein, said cap having a central opening therein exposing an upper portion of said ball and its connecting means, said actuating means comprising a piston disposed within said chamber for movement upwardly into engagement with said ball and downwardly to release said ball, said piston having a horizontal internal passageway extending therethrough, a cam mounted in said chamber and said horizontal passageway for rotational movement, said cam being disposed to drive said piston by contact with a wall of said passageway, spring means for yieldably urging said piston against said ball to lock it in position, handle means for driving said cam to move said piston against said spring means to release said ball, resilient means disposed between said ball and both a horizontal ridge on said base member and an internal surface on said cap to provide frictional resistance to movement of said ball, said resilient means including a spring washer disposed about a minor portion of said ball and acting against said horizontal ridge on said base member to urge said ball upwardly against said annular cap, said resilient means further including two resilient, rubber-like O-rings disposed about said ball, one O-ring engaging said spring washer and said ball, and the other engaging said cap and said ball.

2. The invention of claim 1 in which said base member chamber is formed to have a diameter more than approximately two-thirds of the diameter of said ball, said piston having a diameter such that it is reciprocably guided for relatively loose movement in said chamber, said piston having a spherically concave upper face conformingly receiving a substantial lower portion of said ball.

3. A swivel mount according to claim 1, wherein the handle means comprises a bail which extends halfway around and radially outward of the base member to provide easy access for operating the cam.

4. A swivel mount according to claim 1, wherein the piston has a curved upper surface, a resilient pad attached to said curved surface to provide the engagement between the piston and the ball.

5. A swivel mount according to claim 4, wherein the handle means comprises a bail which extends halfway around and radially outward of the base member to provide easy access for operating the cam.

6. A swivel mount according to claim 1, wherein said annular cap has an internal lip adjacent said central opening to support the O-ring located between the ball and the cap.

7. A swivel mount according to claim 6, wherein the handle means comprises a bail which extends halfway around and radially outward of the base member to provide easy access for operating the cam.

8. A swivel mount according to claim 6, wherein the piston has a curved upper surface, a resilient pad attached to said curved surface to provide the engagement between the piston and the ball.

9. A swivel mount according to claim 8, wherein the handle means comprises a bail which extends halfway around and radially outward of the base member to provide easy access for operating the cam.

* * * * *